(12) United States Patent
Vaman et al.

(10) Patent No.: US 9,036,745 B2
(45) Date of Patent: May 19, 2015

(54) USE OF NEURAL NETWORK BASED MATCHED FILTER FOR FAST RESPONSE TIME IN HIGH-SPEED COMMUNICATIONS CHANNELS

(71) Applicants: Dhadesugoor R. Vaman, Frederick, MD (US); Robert C. Lacovara, Afton, VA (US)

(72) Inventors: Dhadesugoor R. Vaman, Frederick, MD (US); Robert C. Lacovara, Afton, VA (US)

(73) Assignee: KELQUAN HOLDINGS LTD. (MT)

( * ) Notice: Subject to any disclaimer, the term of this patent is extended or adjusted under 35 U.S.C. 154(b) by 0 days.

(21) Appl. No.: 14/312,072

(22) Filed: Jun. 23, 2014

(65) Prior Publication Data
US 2014/0376669 A1    Dec. 25, 2014

Related U.S. Application Data

(60) Provisional application No. 61/837,742, filed on Jun. 21, 2013.

(51) Int. Cl.
*H04L 25/03* (2006.01)
(52) U.S. Cl.
CPC .... *H04L 25/03821* (2013.01); *H04L 25/03019* (2013.01); *H04L 25/03165* (2013.01)

(58) Field of Classification Search
CPC ............... H04L 25/03821; H04L 25/03165; H04L 25/03019
USPC ........................................................ 375/343
See application file for complete search history.

(56) References Cited

U.S. PATENT DOCUMENTS

| | | |
|---|---|---|
| 4,885,757 A | 12/1989 | Provence |
| 7,903,772 B2 | 3/2011 | Jensen |
| 8,233,564 B2 | 7/2012 | Gruenberg et al. |
| 2009/0168913 A1 | 7/2009 | Nakagiri |

OTHER PUBLICATIONS

PCT Search Report, Nov. 17, 2014, 11 pages, U.S.

*Primary Examiner* — Leon Flores
(74) *Attorney, Agent, or Firm* — Keith D. Novak; Carter Ledyard & Milburn LLP

(57) ABSTRACT

A neural network is used within a receiver to discriminate a large set of input waveforms without using a very large set of conventional matched filters. The neural network is trained under actual line conditions as opposed to the requirement for ideal signals when using matched filters. The finite waveforms are based on digital modulation principles. A best match is made between a received waveform from the noisy channel and that of previously trained waveforms in order to extract data. Neural network based matched filter allows data be discriminated separately for each sub-carrier channel in the receiver. The neural network system allows fast processing and is suitable for high-speed data communications systems.

7 Claims, 4 Drawing Sheets

KELQUAN BLOCK DIAGRAM (SINGLE FREQUENCY SYSTEM)

USE OF NEURAL NETWORK BASED MATCHED FILTER FOR FAST RESPONSE TIME IN HIGH-SPEED COMMUNICATIONS CHANNELS

PRIORITY AND RELATED APPLICATION

This application claims priority to U.S. Provisional Patent Application Ser. No. 61/837,742, filed Jun. 21, 2013, entitled "Use Of Neural Network Based Matched Filter For Fast Response Time In High-Speed Communications Channels," which is hereby incorporated by reference in its entirety.

FIELD OF THE INVENTION

The present invention relates to method and apparatus for improving the processing time of matched filters while maintaining resource efficiency (size of the resulting hardware implementation, and power consumption) for any communications system with any type of modulation scheme.

BACKGROUND OF THE INVENTION

A typical communications system can be modeled in terms of sending side 200 and a receiving side 400 with a channel 300 in between them. The sending side 200 usually consists of a data source 210 which generates data (bits) and a modulation system 220 which typically has a carrier which is modulated by the data and the output of the modulation system is band-limited using a Transmit Band Pass Filter (TBPF) 240. The output of the TBPF 240 is sent over a communications channel 300 to the receiving side 400. The channel 300 corrupts the transmitted signal with noise and any interference that might be exhibited due to the channel conditions. Also, the transmitted frequencies vary in frequency, phase and amplitude.

At the receiving side 200, the signal received from the channel 300 is passed through a Receive Band Pass Filter (RBPF) 410 that allows the modulated signal but limits the channel noise to the demodulator. The modulated signal is demodulated and passed through a matched filter 500 for data recovery. The impulse response of the matched filter 500 is trained with an initial signal without the channel noise for optimum waveform generation causing it to respond only to the specific transmitted signal on which it was trained. The demodulator output recovered with the band-limited channel noise is compared with the optimum waveforms generated to accurately estimate the data transmitted. As the number of waveforms increases due to the higher speed data operation, the noise immunity is reduced and therefore Bit Error Rates (BER) is increased. This limits the use of conventional matched filter that is optimized with known "expected waveforms" under no channel conditions as the data transfer rate is increased in bandwidth limited channel and thereby making it difficult to increase the data rates significantly. FIG. 1 shows a basic block diagram of a communications system.

Matched filters have been used for many years in communications channels to achieve optimized Bit Error Rate (BER) performance as a function of Energy per bit over Noise Density ($E_b/N_0$). When the channel carries high-speed data, there is a degree of difficulty in conventional matched filters to characterize the channel condition in real time. One can use delayed characterization which is even more pronounced as the data transmission rate is significantly increased in a bandwidth limited channel. The noise immunity reduces to distinctly match the waveforms to recover the data at the receiver. Conventional matched filters which are trained under no noise condition tend to have more errors on high-speed data transmission as the noise immunity is reduced. As a result use of conventional matched filters cause ambiguities in data recovery and cause bit error rates to increase even when modest inter-frequency-interference is present. Therefore, the Eb/N0 has to be set higher for better Bit Error Rates.

An improved matched filter is desired that will characterize channel conditions in real time. An improved matched filter is needed that will increase the predictability of data even when data transmission rates are increased. A filter is further needed that achieves better data accuracy under channel noise condition when compared to conventional matched filters even when the noise immunity is reduced in high-speed data transmission. Further a communication system is desired that uses an improved matched filter that reduces real estate when compared to such conventional matched filters implemented at a receiver.

BRIEF SUMMARY OF THE INVENTION

A communication channel having super resonance filters that correspond in number to neural network matched filters. Where 4 neural network matched filters and 4 super resonance filters are employed in a 12 bit system, the output of the neural network matched filters is 3 bits each. The neural network matched filter includes a cubic polynomial transfer function that is employed to process input obtained from each said super resonance filter. The neural network matched filters being trained on noisy channel data so that the filters can be trained on the actual channel in use. The present invention reduces the need for separate channel compensation that is usually present in conventional matched filter systems. The neural network matched filters are trained, or adapted, while in use. Once initial training is accomplished, gradual changes in the channel characteristics will be accommodated by continuous periodic re-training of the neural network. This re-training further enhances the data recovery process as the neural network matched filter is adapted to the stochastically varying channel noise.

DETAILED DESCRIPTION OF THE INVENTION

In order to understand the Neural Network Based Matched Filter shown in FIG. 3 a brief description about the current state of the art is provided below using digital compression system described in U.S. Pat. No. 8,233,564 entitled "Method And Apparatus For Increasing The Channel Capacity Of Bandwidth Limited Communications Path", which is incorporated by reference. The '564 system enables service providers to increase the data rates of orders of magnitude higher than previously supported data rates for both wired and wireless infrastructures. Driving this evolution is the customers' increasing expectations for speed, bandwidth and smart mobile devices to support business and consumer applications, and entertainment available through hand-held devices.

Figure 2:
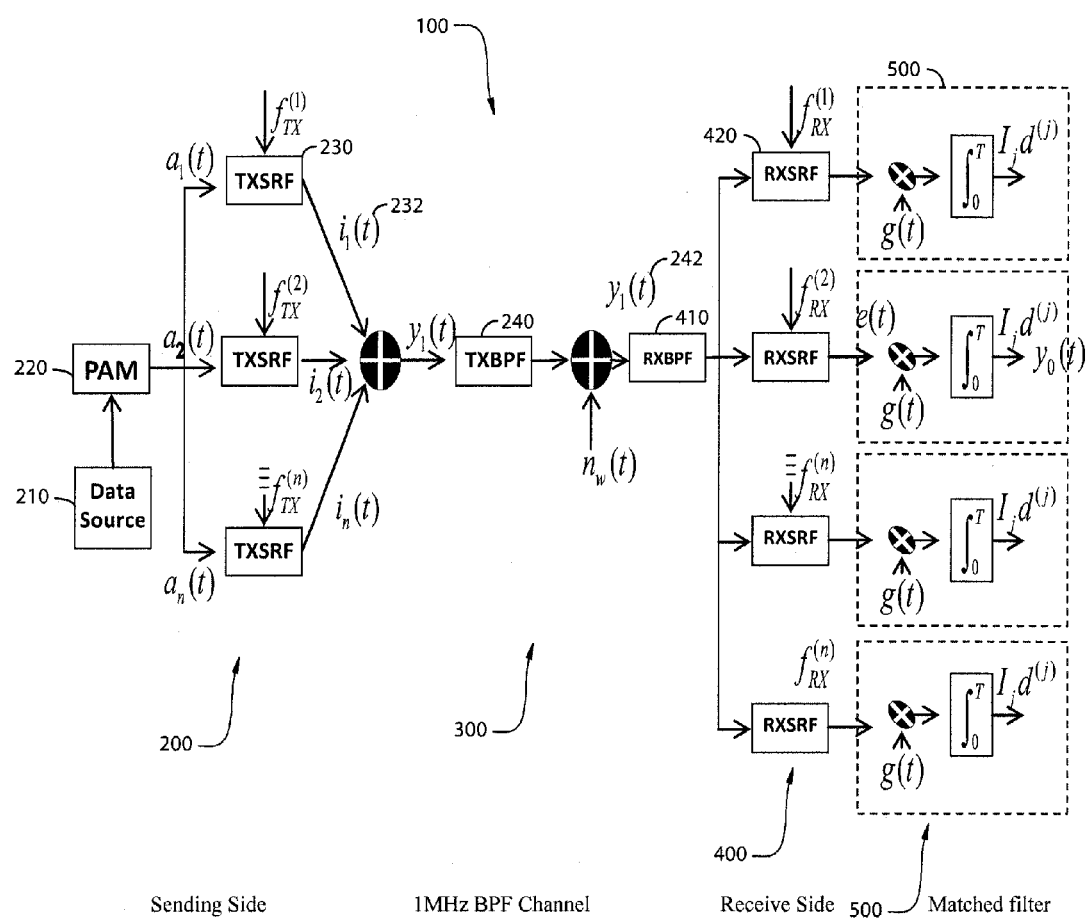
FIG. 2 is a block diagram of a prior art multi-frequency communication system as taught in U.S. Pat. No. 8,233,564.

FIG. 2 shows the block schematic diagram of the high speed data transmission system taught in the '564 system. The symbols in FIG. 2 represent:

$i_j(t)$ outputs of TXSRF at different closely spaced frequencies
$a_n(t)$ discrete multi-level modulation
$f_{TX}^{(n)}$ frequency of the LO
$f_{RX}^{(n)}$ frequency of the LO
$y_1(t)$ sum of the multi-frequency modulated signals
$y_0(t)$ output of the Correlator of the desired signal in the presence of interferers The overall '564 system uses overlapped modulation of subcarriers by independent data stream. The combined modulated frequencies are then transmitted over a 1 MHz channel. The data 210 of 1 Mega symbols/second is used to generate a Pulse Amplitude Modulated (PAM) 220 signal for each Transmit Source Resonance Frequency (TXSRF) system 230. The PAM signal 220 is sampled and processed by the TXSRF 230 of specific subcarrier specified by its Local Oscillator used. It produces spike waveform, $i_j(t)$ 232 with distinct amplitude using a regenerative process for each symbol. The outputs of all TXSRFs 230 are combined and passed through a Transmit Band Pass Filter (TXBPF) 240 of 1 MHz to produce $y_1(t)$ 242 with all modulated subcarriers within the pass-band.

The subcarriers are chosen between 250 KHz to 750 KHz. Each subcarrier is modulated by 1 Mega Symbols/second symbol rate with each symbol carry either 1 bit or 2 bits based on the overall data rate chosen for an application. Since the subcarriers are not orthogonal, the combined modulated subcarriers introduce the inter-frequency-interference. This allows the 1 MHz bandwidth after the TXBPF 240 to preserve the phase and amplitude characteristics distinctly for each subcarrier.

The transmit signal is transmitted over an Additive White Gaussian Noice (AWGN) channel. This signal received at the channel is passed through a 1 MHz Receive Band Pass Filter (RXBPF) 410 before it is sent to Receive Super Resonance Filters (RXSRFs) 420 operating at different Local Oscillator (LO) subcarriers. The RXSRF circuitry is used for recovering the data from the combined band-limited TXSRF signal by a similar regenerative process as that of the TXSRF centered around each LO to suppress the inter-frequency-interference and any other external interference. The output of each RXSRF is then processed at conventional matched filters 500 as shown in FIG. 2.

Figure 1:
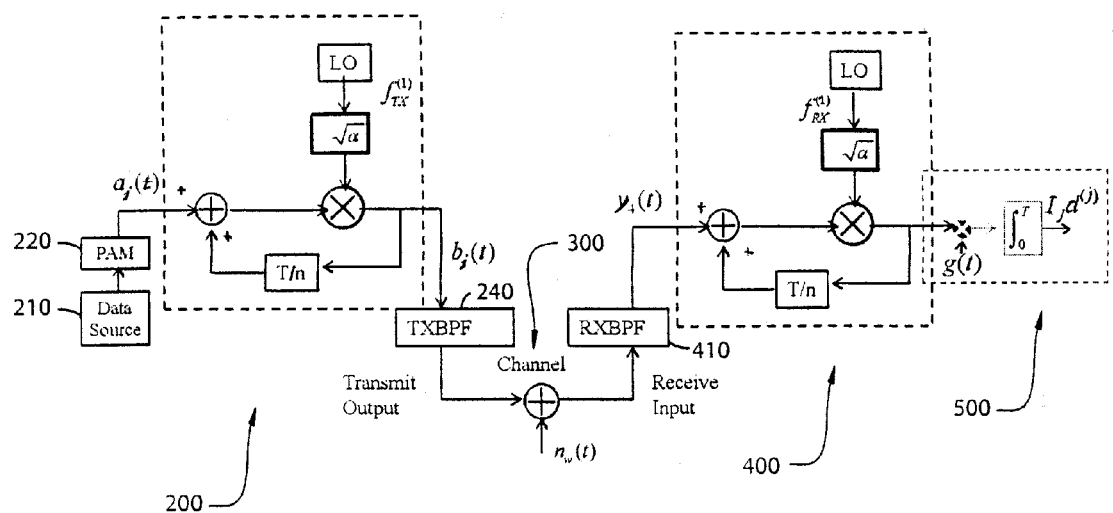
FIG. 1 is a block diagram of a single frequency conventional communication system of the prior art.

The difference between ordinary communication systems such as that shown in FIG. 1 and the '564 system shown in FIG. 2 is that the '564 system has SRF's. Ordinary communication systems don't have SRF's so there the RXFBF 410 would go out directly to matched filters 500. The number of matched filters equals the number of symbols, M, which is controlled by the number of bits, k. Thus, where $M=2^k$, a 12-bit system would provide $2^{12}$ or 4096 symbols and require the same number of matched filters 500. So in an ordinary communication system 100 where there are 12 bits, the RXFBF 410 would connect to 4096 matched filters 500. However, in the system 1000 in FIG. 2 a lot less matched filters 500 would need to be used when compared to the ordinary system. Thus, in a 12 bit system employed in the system 1000, the 4096 symbols would mean 4096 matched filters are required but as there are four RXSRF's each RXSRF would handle a quarter of the matched filters or a set of 1024 matched filters 500. Therefore, the neural network implementation reduces the real estate in hardware.

Figure 3:
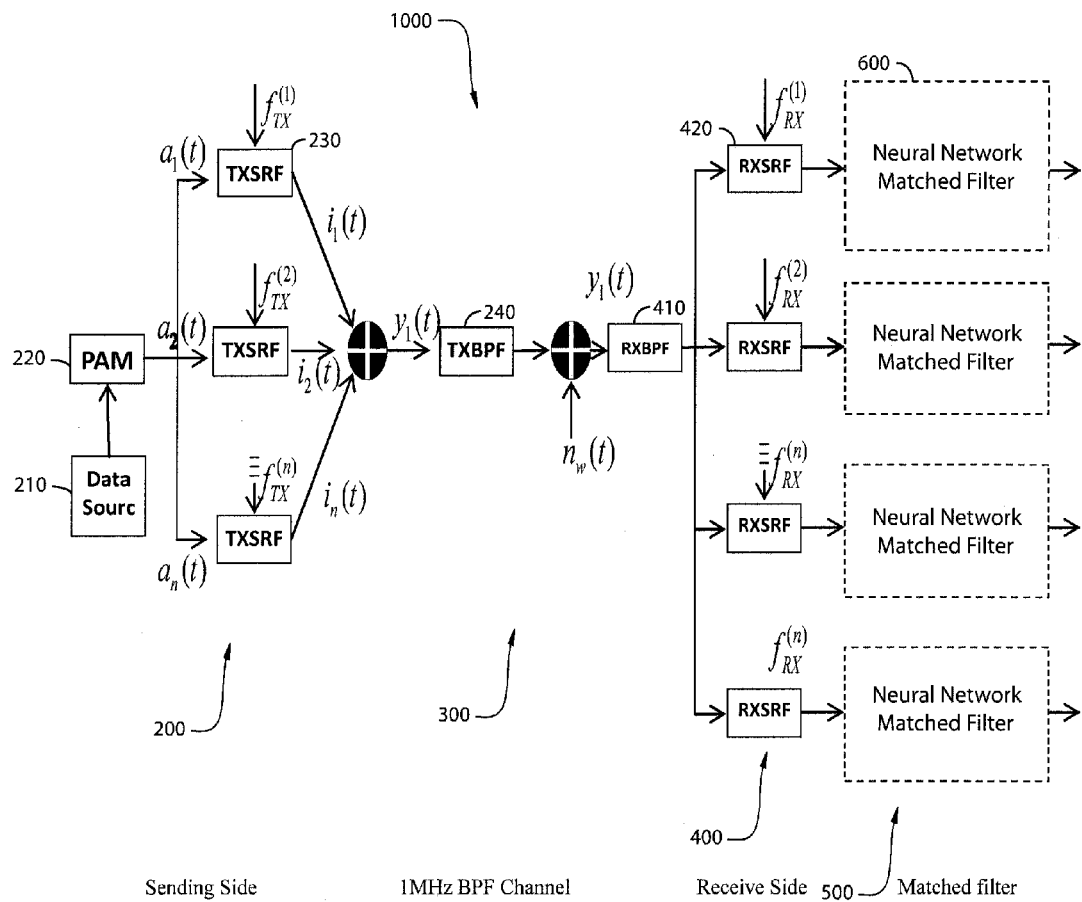
FIG. 3 is a block diagram of a multi-frequency communication system of the current invention using a neural network based matched filter.

Looking now to FIG. 3, a neural network based matched filter 600 of the present invention is shown employed with a communications channel system 1100. The overall design of system 1100 is similar to the system 1000 in FIG. 2 and includes a Modulation and Transmit Source Resonance Frequencies 230, 420, channel 300, receiver and data recovery processes and a neural network based matched filter 600.

Modulation and Transmit Source Resonance Frequencies

The system 1100 is configured to transmit 4 to 8 subcarriers frequencies. These subcarriers are each capable of modulation by 1, 2 or 3 bits, yielding a system that handles 4 to 24 bits of data per symbol period of 1 μs. The system 1100 will also permit complex, I/Q modulation, which doubles the capacity of the system to near the Shannon limit. Table 1 illustrates various operating modes of bits per subcarrier frequency.

| Subcarrier Frequency | Bits per frequency | | |
|---|---|---|---|
| | 1 | 2 | 3 |
| 4 | 4 | 8 | 12 |
| 6 | 6 | 12 | 18 |
| 8 | 8 | 16 | 24 |

In Table 1, the subcarrier frequencies under in the 1 bit per frequency column are preferred from a bit error rate (BER) perspective, the subcarrier frequencies in the 2 bits per frequency column have been tested in simulation and the subcarrier frequencies in the 3 bits per frequency column are shown to be possible configurations. As mentioned above, the current invention provides examples of a 12 bit implementation which is provided by 3 bits by 4 subcarrier frequencies or 2 bits by 4 subcarrier frequencies. Such examples should not be viewed as limiting. The subcarrier frequencies here are not orthogonal but are rather closely spaced on the order of tens of kilohertz. The operation of the Transmit SRF 230 is to convert the modulated subcarrier signals into a set of 4 to 8 nearly-orthogonal signals. A critical property of this approach is that these signals are added together into one signal and filtered for output on a suitable band-limited channel. In actual implementation of the transmit section, the Transmit SRF 230 does not have to run continuously. The output of the Transmit SRF 230 can be tabled, and transmit symbols built from a lookup table. This reduces the transmit-side circuitry to a simple minimum.

Channel Requirements:

Spectral efficiency is an index computed by dividing the data rate by the channel bandwidth. E.g., (24 Mb/s)/1 MHz=24 bits/second/Hz. If the system 1100 carries data in 6 closely spaced frequencies uses a channel bandwidth of 1 MHz to achieve a spectral efficiency of up to 24 bits/second/Hz. When the channel is 1 MHz, the values in the table above are the spectral efficiency of the system.

Receiver and Data Recovery process:

The receiver 410 obtains the 1 MHz band-limited signal from the channel 300. This signal is filtered and up-sampled to the receive SRF 420 sampling rate, nominally 128 Mega samples/second (MS/s). The up-sampled signal is applied to a Receiver SRF 420, a circuit similar to the Transmit SRF 230. Unlike the Transmit SRF 230, each Receiver SRF 420 runs continuously and produces thirty-two outputs. These outputs are applied to a neural network for discrimination. In another implementation, a 64 MS/s signal is input and the RXSRF 420 produces 8 words per microsecond. In either example the neural network matched filter 600 will have 1, 2, or 3 bits out. As likely evident above, the selection of MS/s and words per microsecond are engineering choices made during the design phase to accommodate requirements of a specific application and the available channel characteristics.

Neural Network Based Matched Filter 600

The neural network determines the most likely input data in the presence of noise at the receiver as it receives the output from each RXSRF. Neural network based matched filter 600 is trained by sending known data over each frequency. The frequencies are closely spaced and the combined signal is band-limited. In contrast, as described above, the conventional matched filter approach requires a significant number of matched filters to extract the data from each of the frequencies. Even in system 1100 of FIG. 3, though the use of RXSRF (Receive SRF) 420 minimizes the inter-frequency-interference, the impulse response for each of the matched filter 500 needs to be determined with the training data.

In the current invention with the neural network approach, the number of neural networks 600 required is significantly reduced over the number of matched filters otherwise required. As mentioned above, in a 12-bit system there are 4096 symbols and thus 4096 matched filters. If system 1100 is a 12-bit system having four subcarrier frequencies, four RXSRFs then, according to Table 1, the number of neural network matched filters 600 required would be four with each neural network matched filter 600 putting out 3 bits per frequency. This is true as the number of neural networks will equal the number of subcarrier frequencies and the number of RXSRFs. So if system 1100 is a 12-bit system having six subcarrier frequencies, six RXSRFs, and six neural network matched filters 600 each neural network matched filter 600 would output 2 bits per frequency Also, the training for extracting the data from each of the RXSRF 420 can be extracted to generate a best estimate of the data. The best estimate is stored for all possible combinations of data. When the actual data is transmitted, the output of the neural network is matched to the best estimate of the original data applied to the system. The output of the neural network trained matched filter is the receiver's best estimate of the original data applied to the system.

Since the neural network based matched filter derives the output for transmitted data under the presence of channel noise, it is more accurate than conventional matched filters for recovering the actual data lower at a lower Eb/N0. The amount of channel noise used during training will be set based on the actual SNR of the channel, allowing the overall system using a neural network based matched filter to perform better. In addition to the improved system reducing the number of neural networks, the overall real estate in the hardware and power consumed by the hardware can be reduced.

Figure 4:
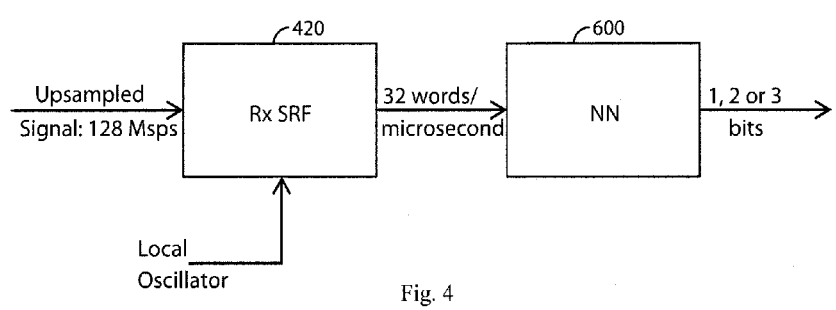
FIG. 4 is a block schematic diagram of the receive section for one sub-channel (uses one sub-carrier or frequency).

FIG. 4 illustrates a block diagram of the neural network based matched filter 600 for a single subcarrier frequency that discriminates signals for data recovery. An incoming RF signal, or an incoming baseband signal is re-sampled to the desired Receive SRF sampling frequency. The sampling rate can be pre-set to any value and the results are not impacted. In one example, if the input to the system is RF, it is demodulated to baseband, filtered, and re-sampled to 128 MS/s (Million samples per second). If the input to the system is baseband, it is filtered and up-sampled to 128 MS/s. It is the 128 MS/s representation of the input signal which is applied to each Receive SRF.

Figure 5:
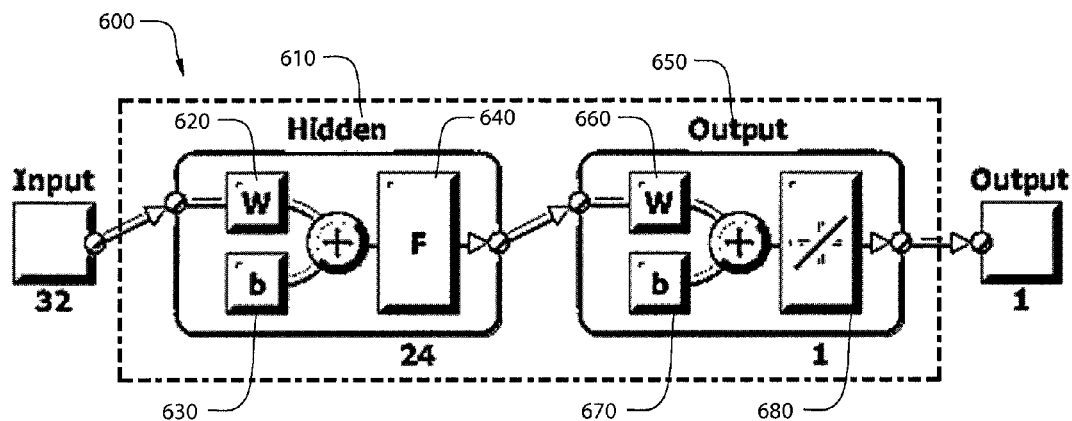
FIG. 5 shows architecture of one neural net based matched filter.

For every subcarrier frequency in the input, there is one Receive SRF 420 and one neural network based matched filter 600. A closer look at the architecture of the Neural Net Based Matched Filter 600 is shown in FIG. 5. The neural network based matched filter 600 uses a two layer fitting network, one hidden layer 610 and one output layer 650. The hidden layer 610 is shown in FIG. 5 to have 24 nodes but may have more or less in other embodiments.

In one example, the output of the Receive SRF 420 consists of 32 fixed point words each symbol time, or 1 μs. This vector of 32 words is applied to the hidden layer 610 of the neural network 660. The 32 words/μs are multiplied by a set of 32 weights, W, 620 at each of the 24 nodes. This is an ordinary dot product between the 32 input words and the 32 weights, which is carried out on each of the 24 nodes. After the dot product, a 32 word bias vector is added to the dot product. As a result of processing at the hidden layer 610 the 32 words are brought down to 24 words which are then pushed through the transfer function F, 640. The transfer function F 640 employed herein is described below in relation to equation 2.

The 24 numbers as the output of the hidden layer 610 is then processed by the output layer 650 in a similar process as in the hidden layer 610 but without processing at a transfer layer in the output layer 650. The result at the output layer 650 is a whole number that can be converted from a decimal to a binary number. In the present example 3 bits are produced so the whole number resulting from the output layer 650 is mapped to a 3-bit binary number. In another embodiment, the input from the SRF 420 can be 8 words which pass into 8 nodes in the hidden layer 610 resulting in a total of 64 input weights which is far less than the weights employed in the previous example with 32 input and 24 weights.

The number of neural network based matched filters 600 implemented for a system 1100 that operates with 4 modulated and shaped frequencies carrying a total of 12 bits of data within 1 MHz produces a spectral efficiency of 12 bits/second/Hz. For this system, the number of neural networks used is 4. Whereas, with conventional matched filter approach would require a total of $2^{12}$ (or 4096) matched filters to recover the data. It increases the real estate in hardware by orders of magnitude and the processing time in parallel operation is significantly high. Accordingly, use of neural network based matched filters 600 show a significantly reduced number of matched filters by orders of magnitude when compared to the number of conventional matched filters. In the system 1100 where 12 bits are used the number of neural network based matched filters are reduced to 4 compared to 4096 conventional matched filters used in a 12 bit system 100.

After the dot product and bias addition, each resulting scalar is applied to a transfer function F, 640. In most function-fitting neural networks, the typical transfer function F is a symmetric sigmoid transfer function ("tansig") shown in equation (1) below.

$$y = \frac{2}{1+e^{-2x}} - 1 \qquad (1)$$

The transfer function 640 is applied to each of the 24 scalars from the dot product and addition, resulting in an output of a 24 word vector passed to the output layer 650.

Tansig transfer functions are difficult to synthesize in hardware using FPGAs such as Xilinx Vertex 6 Field Programmable Gate Arrays which may be used in the current invention. The difficulty is attributed to the need to calculate an exponential and perform a division. In the current invention the tansig transfer function is replaced with a cubic polynomial designed to approximate a tan sigmoid curve. This transfer function, F, 640 consists of a process to limit the input range to ±1, followed by a cubic polynomial shown in the formulas in equation 2 below. This novel implementation of the cubic polynomial designed transfer function, F, to approximate the tan sigmoid curve is truncated to manage the input within the range of ±1. The truncated sigmoid curve is easier to implement using conventional addition and multiplication compared to the tan sigmoid which requires computation of "exponential" and "division" operation, as stated above.

Figure 6:
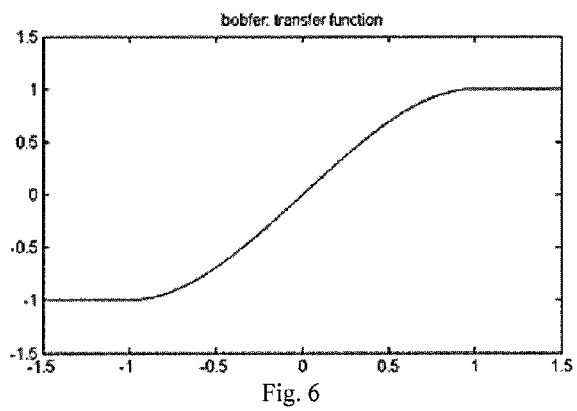
FIG. 6 shows a cubic polynomial approximated transfer function.
Figure 7:
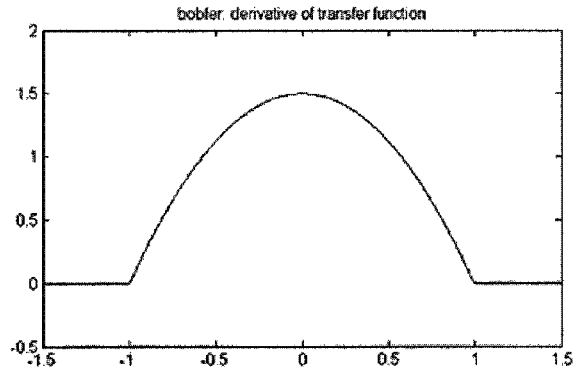
FIG. 7 shows a derivative of a cubic polynomial approximated transfer function Derivative of Cubic Polynomial Approximated Transfer Function.

The resulting transfer function F 640 based on equation (2) is shown in FIGS. 6 and 7 for u and y respectively. FIG. 6 shows a curve that is an approximation of the tansig while FIG. 7 shows the first derivative thereof which is well-behaved outside −1 to 1 and zero between −1 and 1. The use of equation 2 in the transfer function, F makes it practical for use in the FPGA.

$$u = \max\left(-1, \min\left(1, \frac{u}{2}\right)\right) \quad (2)$$
$$y = \left(\frac{u}{2}\right) * (3 - u^2)$$

The output layer 650 computes a single dot product between the output of the hidden layer 610 and a 24 element weight vector. A scalar bias is applied. The resulting scalar is then passed through an output layer transfer function 680. In this system the output layer transfer function 680 is trivial: y=x. Since dot product is purely arithmetic, it reduces the complexity in using truncated cubic function compared to using tansig function. This will reduce the number of gates (or real estate) in the FPGA.

The neural network based matched filter 600 generates an output value in the range of −1.5<y<1.5. Depending on the number of input bits transmitted over a subcarrier channel in the transmitter, thresholds are set up so that a comparator chooses the closest noiseless data point, and assigns a binary value accordingly. For example, if only one bit is transmitted per subcarrier, a simple sign operation selects a 0 or 1 output. For two bits, the ideal values are [−1, −⅓, ⅓, 1]. These values correspond to binary values [00, 01, 10, 11]. The neural network can compute this output either in the fixed point case, in which the neural network is followed by a comparator; or it can incorporate the comparator. In contrast, the '564 system design uses a separate comparator to obtain the 1, 2 or 3 bits of output per subcarrier channel.

The current invention uses the neural network as a matched filter under a given channel noise condition. The neural network based matched filter 600 thus increases the predictability of the data even when the data transmission rate is increased. The neural network based matched filter 600 also significantly increases the accuracy of the data recovery when compared to conventional matched filters 500 used in communications.

A conventional matched filter implementation requires training on a noiseless version of the channel to be used. The penalty of using neural networks 600 is that it not only requires training initially on a given channel with noise, but also requires periodic retraining to adapt the neural network for channel noise variation. However, since the training is on a noisy known signal, many problems associated with the conventional matched filter are avoided. This trade-off between training of neural network for channel conditions and better accuracy of data recovery does not increase the circuit complexity significantly even for high-speed data transmission applications. Therefore achieving better data accuracy under channel noise condition is achievable even when the noise immunity is reduced in high-speed data transmission whereas, conventional matched filters 500 which tend to be trained under no noise condition tend to have more errors on high-speed data transmission as the noise immunity is reduced. The implementation of neural network based matched filter 600 is particularly useful in wireless channels where multi-path fading impairments and Doppler effects exist.

Neural Network Training

A set of training data consists of two components. The target data is a long (4096 symbol) sequence of data inputs to the transmitter. This is considered "truth" or baseline data. The transmitter modulates this stream, and sends it to the receiver, where it is eventually applied to the input of the neural networks. Because the input data to the transmitter is known, the original target data is used in the training process as the target of an optimization process. The Levenberg-Marquardt algorithm, or a similar algorithm such as conjugate gradient back propagation, is used to find a set of weights for each of the neural networks so that the mean square error between the ideal target output and the actual output during training is minimized.

This training is performed on a newly-initialized system, and is repeated whenever there is sufficient change in the channel to warrant retraining, as measured by an increasing bit error rate. However, during normal operation, channel changes will occur continuously, but relatively slowly. Therefore, a periodic set of training data may be sent to incrementally adjust the neural net weights as needed.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. A communication channel transmitting a number of subcarrier frequencies comprising:
    super resonance filters; and
    digital neural network based matched filters, wherein each of the super resonance filters and each of the neural network based matched filters are equal in number to the number of said subcarrier frequencies and wherein said digital neural network is trained in the presence of channel noise.

2. The channel of claim 1, wherein at a 1-bit output at each said neural network matched filter said subcarrier frequencies equals in number to a number of bits for the channel.

3. The channel of claim 1, wherein at a 2-bit output at each said neural network matched filter said subcarrier frequencies is half in number to a number of bits for the channel.

4. The channel of claim 1, wherein at a 3-bit output at each said neural network matched filter said subcarrier frequencies is one-third in number to a number of bits for the channel.

5. The channel of claim 1, wherein said neural network matched filter includes a cubic polynomial transfer function.

6. A method of reducing hardware complexity and speed of processing data recovery in a communication system comprising:
    training digital neural network matched filters, in the presence of channel noise;
    receiving a number of subcarrier frequencies in said system;
    providing a number of super resonance filters, wherein said number of super resonance filters is equal in number to the number of subcarrier frequencies and said digital neural network matched filters.

7. The method of claim 6, wherein after said training of said neural network, said neural network is adapted while in use.

* * * * *